(12) United States Patent
Keil et al.

(10) Patent No.: US 7,519,301 B2
(45) Date of Patent: Apr. 14, 2009

(54) EMITTER FOLLOWER DRIVER FOR SILICON OPTICAL MODULATOR

(75) Inventors: Ulrich Keil, Broenshoei (DK); Steen Bak Christensen, Roskilde (DK)

(73) Assignee: Intel Corporation, Santa Clara, CA (US)

( * ) Notice: Subject to any disclaimer, the term of this patent is extended or adjusted under 35 U.S.C. 154(b) by 840 days.

(21) Appl. No.: 10/955,580

(22) Filed: Sep. 30, 2004

(65) Prior Publication Data

US 2006/0067708 A1    Mar. 30, 2006

(51) Int. Cl.
*H04B 10/04* (2006.01)
(52) U.S. Cl. ...................................................... 398/183
(58) Field of Classification Search ................. 398/182, 398/183
See application file for complete search history.

(56) References Cited

U.S. PATENT DOCUMENTS

| 6,563,623 | B1 * | 5/2003 | Penninckx et al. | 398/188 |
| 2003/0180054 | A1 * | 9/2003 | Watanabe et al. | 398/182 |

* cited by examiner

*Primary Examiner*—Quan-Zhen Wang
(74) *Attorney, Agent, or Firm*—Blakely, Sokoloff, Taylor & Zafman LLP (57) ABSTRACT

According to embodiments of the present invention, an emitter follower-based or source follower-based driver is coupled to drive a silicon-based Mach-Zehnder interferometer optical modulator. In one embodiment, the emitter/source follower includes a pair of transistors that drive a differential electrical data signal to a pair of phase shifters in the optical modulator. In other embodiments, a pair of current source transistors provides an extra current for the differential electrical data signal.

16 Claims, 5 Drawing Sheets

EMITTER FOLLOWER DRIVER FOR SILICON OPTICAL MODULATOR

BACKGROUND

1. Field

Embodiments of the present invention relate to electrical signal drivers and, in particular, to an emitter follower driver.

2. Discussion of Related Art

Drivers may be used in telecommunication systems and/or networks to drive electrical and/or optical signals. Traditional drivers have limitations, however.

BRIEF DESCRIPTION OF THE DRAWINGS

In the drawings, like reference numbers generally indicate identical, functionally similar, and/or structurally equivalent elements. The drawing in which an element first appears is indicated by the leftmost digit(s) in the reference number, in which.

DETAILED DESCRIPTION OF THE ILLUSTRATED EMBODIMENTS

Figure 1:
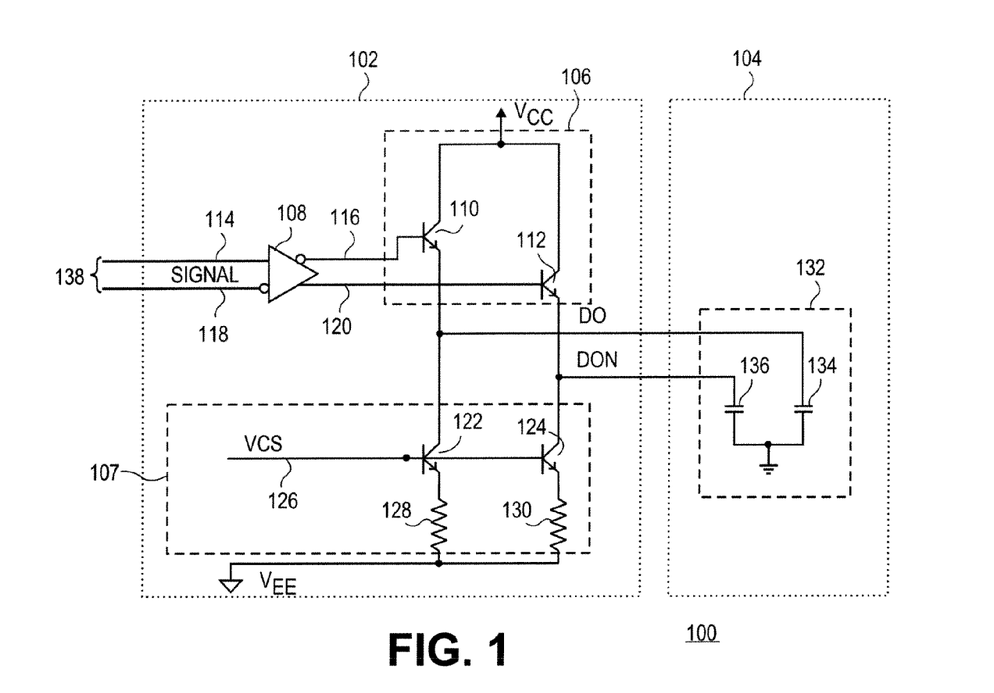
FIG. 1 is a schematic diagram of a photonic device according to an embodiment of the present invention.

FIG. 1 is a schematic diagram of a photonic device 100 according to an embodiment of the present invention. The illustrated photonic device 100 includes a driver 102 coupled to an optical modulator 104. Although FIG. 1 depicts the transistors with symbols commonly used for bipolar transistors the design principles are also valid for other types of transistors, such as field effect transistors, for example. In one embodiment, the driver 102 and optical modulator 104 may be fabricated using complimentary metal oxide semiconductor (CMOS) technology.

In the illustrated embodiment, the driver 102 includes an emitter follower 106 coupled to a current source 107 and a differential buffer 108. The emitter follower 106 may have input impedance that is much larger than its output impedance. The emitter follower 106 may have a current gain and may not have a voltage gain.

The example emitter follower 106 includes a first transistor 110 and a second transistor 112. In the illustrated embodiment, the base of the transistor 110 is coupled to the output terminal 116 and the collector of the transistor 110 is coupled to a collector voltage $V_{CC}$. The base of the transistor 112 is coupled to the output terminal 120 and the collector of the transistor 112 is coupled to $V_{CC}$.

Also in the illustrated embodiment, the buffer 108 includes a first input terminal 114, a first output terminal 116, a second input terminal 118, and a second output terminal 120. The illustrated output terminal 116 is a negative output terminal and the illustrated output terminal 120 is a positive output terminal.

In the illustrated embodiment, the example current source 107 includes a third transistor 122 coupled to a fourth transistor 124. The emitter of the example transistor 122 is coupled to $V_{EE}$ through a resistor 128, the base of the transistor 122 is coupled to a terminal 126, which couples a current source bias voltage $V_{CS}$ to the current source 107. The collector of the example transistor 122 is coupled to the emitter of the transistor 110. The emitter of the example transistor 124 is coupled to an emitter voltage $V_{EE}$ through a resistor 130 and the base of the transistor 124 is coupled to the terminal 126. The collector of the example transistor 124 is coupled to the emitter of the transistor 112.

In the illustrated embodiment, the optical modulator 104 is shown with a single segment 132 having a first phase shifter 134, such as a waveguide phase shifter, for example, (as represented by a capacitor) and a second phase shifter 136 (as represented by a capacitor). In embodiments of the present invention, the optical modulator 104 may have several segments, such as eleven segments, for example. In the illustrated embodiment, the emitter of the transistor 110 and the collector of the transistor 122 are coupled to the phase shifter 134. The emitter of the transistor 112 and the collector of the transistor 124 are coupled to the phase shifter 136.

In embodiments of the present invention, the optical modulator 104 may be a semiconductor-based Mach-Zehnder modulator. Although shown with a single segment 132, in embodiments of the present invention the optical modulator 104 may have several segments, such as eleven segments, for example.

The buffer 108 may be any buffer suitable for amplifying a differential data signal. In one embodiment, the buffer 108 may be capable of amplifying a 2.5 gigabits per second (2.5 Gbps) or higher data rate signal to approximately two volts peak-to-peak (2Vpp) or better.

The transistors 110, 112, 122, and 124 may be any suitable bipolar transistors that perform the functions described herein. In embodiments of the present invention, the transistors 110, 112, 122, and 124 may be bipolar transistors, such as silicon germanium heterojunction bipolar transistors, for example. In other embodiments, the transistors 110, 112, 122, and 124 may be field effect transistors (FETs), such as CMOS FETs, for example, and form a source follower instead of an emitter follower.

As described above, the terminal 126 couples a bias voltage to the current source 107. In one embodiment, a current mirror (not shown) may provide the bias voltage to the current source 107. The bias voltage may provide a substantially constant current and/or bias voltage for the transistors 122 and 124.

The resistors 128 and 130 may be any suitable emitter degradation resistors. In embodiments of the present invention, the resistor 128 may be twenty-five ohms (25 Ω) and the resistor 130 may be twenty-five ohms (25 Ω).

In one embodiment, the electrical data signal 138 may be of two volts peak-to-peak ($2V_{pp}$) with a data rate of 2.5 gigabits per second (2.5 Gbps), the capacitance per length of an individual phase shifter 134 and/or 136 may be 7.5 picofarads per millimeter (7.5 pF/mm), and the length of an individual phase shifter 134 and/or 136 may be approximately 315 micrometers (315 µm).

In one embodiment, the gate 108 may receive a differential data signal 138 on the input terminals 114 and 116. The gate 108 may amplify the data signal 138 and couple the amplified data signal 138 to the output terminals 116 and 120. In embodiments, the driver 102 may amplify the current in the data signal 138.

When the data signal 138 goes high on the base of the transistor 110 the transistor 110 turns on, current may be pulled from the phase shifter 134 to $V_{CC}$, and the phase shifter 134 may be charged up to $V_{CC}$ minus $V_{BE}$ of the transistor 110. When the data signal 138 goes low on the base of the transistor 110 the transistor 110 turns off, a constant current flows through the transistors 122 and 124 into $V_{EE}$, and the phase shifter 134 discharges to $V_{EE}$ through the transistor 122.

Because the data signal 138 may be a differential signal the signal on the terminals 114 and 116 are one hundred eighty degrees out of phase with the signals on the terminals 118 and 120. When the data signal 138 goes high on the base of the transistor 112 the transistor 112 turns on, current may be pulled from the phase shifter 136 to $V_{CC}$, and the phase shifter 136 may be charged up to $V_{CC}$ minus $V_{BE}$ of the transistor 112. When the data signal 138 goes low on the base of the transistor 112 the transistor 112 turns off, a constant current flows through the transistors 122 and 124 into $V_{EE}$, and the phase shifter 136 discharges to $V_{EE}$ through the transistor 124.

From a large signal perspective, in one embodiment, current may be sourced much faster to $V_{CC}$ (output high) through the transistors 110 and 112 than to $V_{EE}$ through the transistors (output low) 122 and 124. The data signal at D0 and D0N thus may be asymmetrical in that the data signal at D0 and D0N may have a rising edge that rises exponentially and a falling edge that falls linearly.

Figure 2:
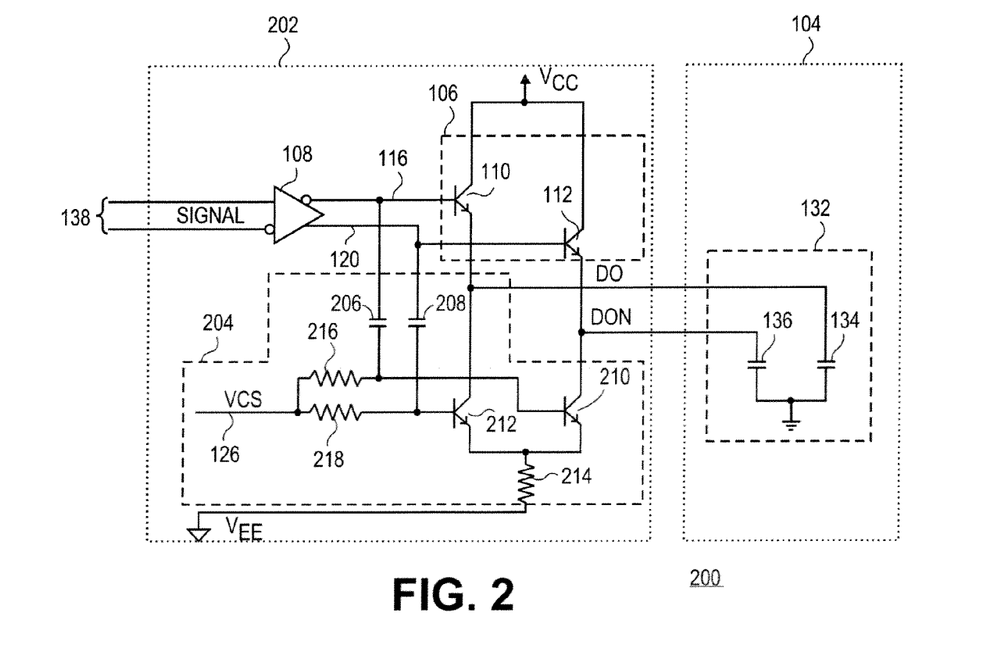
FIG. 2 is a schematic diagram of a photonic device according to an alternative embodiment of the present invention.

FIG. 2 is a schematic diagram of a photonic device 200 according to an alternative embodiment of the present invention in which a driver 202 includes the emitter follower 106 and a current source 204. In the illustrated embodiment, the current source includes a first capacitor 206 and a second capacitor 208 that differentiate the data signal at D0 and D0N so that a transistor 212 may turn off during the rising edge of the data signal at D0 and the transistor 210 may turn off or down during the rising edge of D0N. The current through the transistor 212 may be increased during the falling edge of the data signal at D0 and the current through the transistor 210 may be increased during the falling edge of the data signal at D0N.

For example, in one embodiment, the data signal on the terminal 116 and the base of the transistor 110 may be cross-coupled to the base of the transistor 112's current source transistor 210 using the capacitor 206. When the data signal on the terminal 116 goes high on the base of the transistor 110 the transistor 110 turns on, current may be pulled from the phase shifter 134 to $V_{CC}$, the phase shifter 134 may be charged up to $V_{CC}$ minus $V_{BE}$ of the transistor 110. In the illustrated embodiment, the capacitor 208 is coupled to the opposite terminal 120 whose data signal goes low while the data signal on the terminal 116 goes high. The capacitor 208 couples the differentiated signal, which is low during down-transition, to the transistor 212 and prevents current from being sourced from the phase shifter 134 to $V_{EE}$. When the data signal on the terminal 116 goes low on the base of the transistor 110 the transistor 110 turns off, the phase shifter 134 may be discharged to $V_{EE}$. When the data signal on the terminal 120, goes high when the data signal on the terminal 116 goes low the capacitor 208 couples the differentiated signal, which is high during up-transition, to the transistor 212 and an extra current is sourced from the phase shifter 134 to $V_{EE}$.

The same principle applies to transistors 112 and 210. For example, in one embodiment, the data signal on the terminal 120 and the base of the transistor 112 may be cross-coupled to the base of the transistor 110's current source transistor 212 using the capacitor 208. When the data signal on the terminal 120 goes high on the base of the transistor 112 the transistor 112 turns on, current may be pulled from the phase shifter 136 to $V_{CC}$, the phase shifter 136 may be charged up to $V_{CC}$ minus $V_{BE}$ of the transistor 112. In the illustrated embodiment, the capacitor 206 is coupled to the opposite terminal 116 whose data signal goes low while the data signal on the terminal 120 goes high. The capacitor 206 couples the differentiated signal, which is low during down-transition, to the transistor 210 and prevents current from being sourced from the phase shifter 136 to $V_{EE}$. When the data signal on the terminal 120 goes low on the base of the transistor 112 the transistor 112 turns off, the phase shifter 136 may be discharged to $V_{EE}$. When the data signal on the terminal 116 goes high when the data signal on the terminal 120 goes low the capacitor 206 couples the differentiated signal, which is high during up-transition, to the transistor 210 and an extra current is sourced from the phase shifter 136 to $V_{EE}$.

In one embodiment the transistors 210 and 212 may share a resistor 214. This sharing may result in differential operation of the transistors 210 and 212 and may provide a more pronounced turn-on and turn-off of the extra current provided by the transistors 210 and 212 during transition between phases of the data signal 138.

In one embodiment, the transistors 110 and 112 may have an open base breakdown voltage of approximately five volts (5V) or greater. In an alternative embodiment, the transistors 122 and 124 may have an open base breakdown voltage of approximately five volts (5V) or greater.

The resistor 214 may be any suitable emitter degradation resistor. In embodiments of the present invention, the resistor 214 may be 12.5 ohms. The capacitors 206 and 208 may be any suitable capacitors capable of performing the functions described herein. In embodiments of the present invention, the capacitor 206 may be 300 femtofarads (300 fF) and the capacitor 208 may be 300 femtofarads (300 fF).

Figure 3:
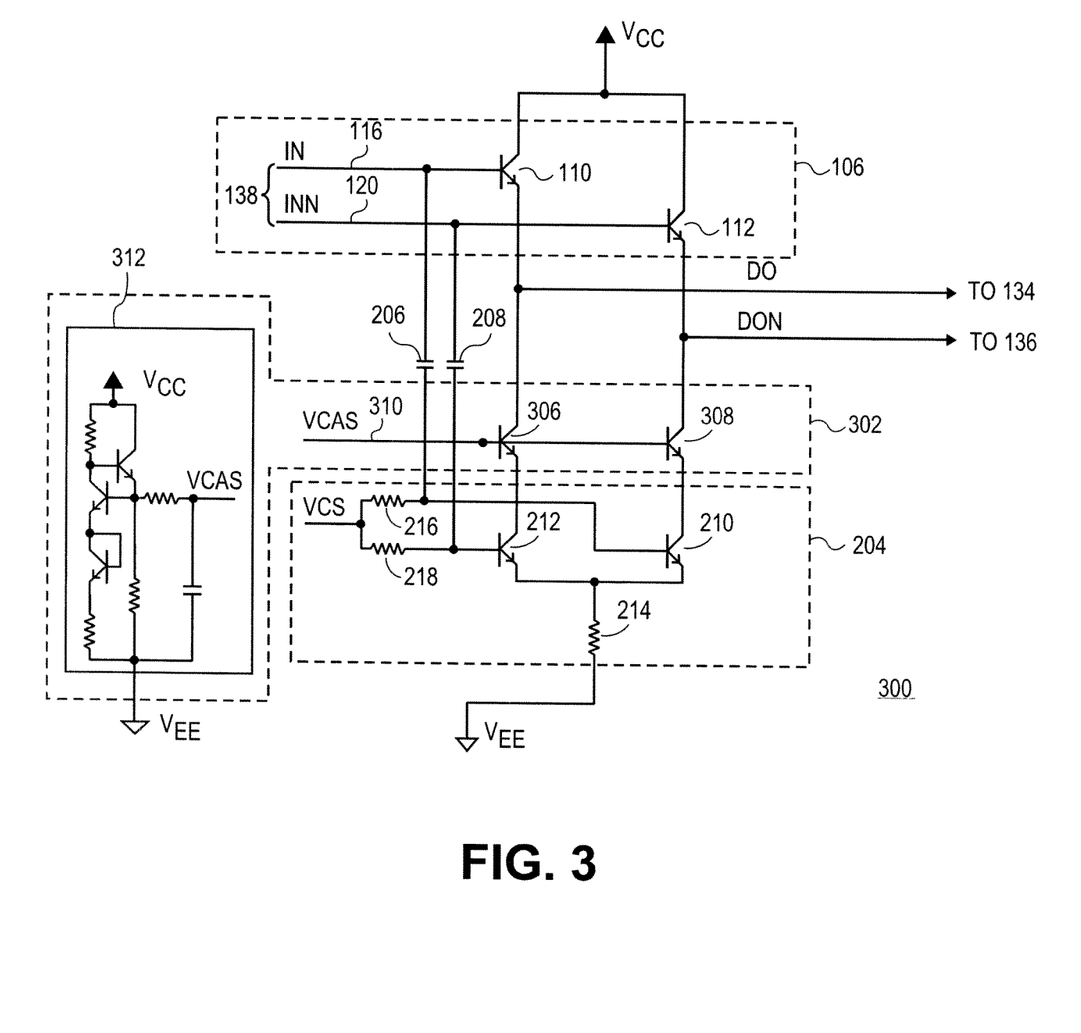
FIG. 3 is a schematic diagram of a driver according to another embodiment of the present invention.

FIG. 3 is a schematic diagram of a driver 300 according to an alternative embodiment of the present invention in which the driver 300 includes the emitter follower 106, the current source 204, and a cascode stage 302 coupled between the emitter follower 106 and the current source 204. In the illustrated embodiment, the cascode stage 302 includes a first cascode transistor 306, a second cascode transistor 308, and a terminal 310, which couples a cascode stage bias voltage $V_{CAS}$ to the cascode transistors 306 and 308.

In one embodiment, when the data signal 116 goes high (to $V_{CC}$) on the base of the transistor 110, the transistor 110 turns on, the voltage on the emitter of the transistor 110 goes high ($V_{CC}-V_{BE}$) and the voltage across the current source 204 is $V_{CC}-V_{BE}-V_{EE}$. For supply voltages of 5.2V, $V_{CC}-V_{BE}-V_{EE}$ may be approximately 4.3V, which may exceed the breakdown voltage of the transistors 122, 124, 212, and/or 210. In the illustrated embodiment, the transistors 306 and 308 may drop some of the voltage in the path to $V_{EE}$, reducing the voltage drop on the transistor 212 and 210, respectively. In embodiments in which the operating voltages are relatively high the transistors 306 and 308 may be high-voltage transistors.

In one embodiment, when the data signals on the terminals 116 and 120 go low (to $V_{CC}-V_{SWING}$) on the base of the transistors 110 and 112, respectively, the voltages on the emitters of the transistors 110 and 112 go to $V_{CC}-V_{SWING}-V_{BE}$. The voltage drops from the collectors to the emitters $V_{CE}$ of the transistors 110 and 112 are $V_{SWING}+V_{BE}$. As an example, if $V_{SWING}=2.5V$ then $V_{CE}=3.4V$. In the illustrated embodiment, the transistors 110 and 112 may be high voltage transistors.

Figure 4:
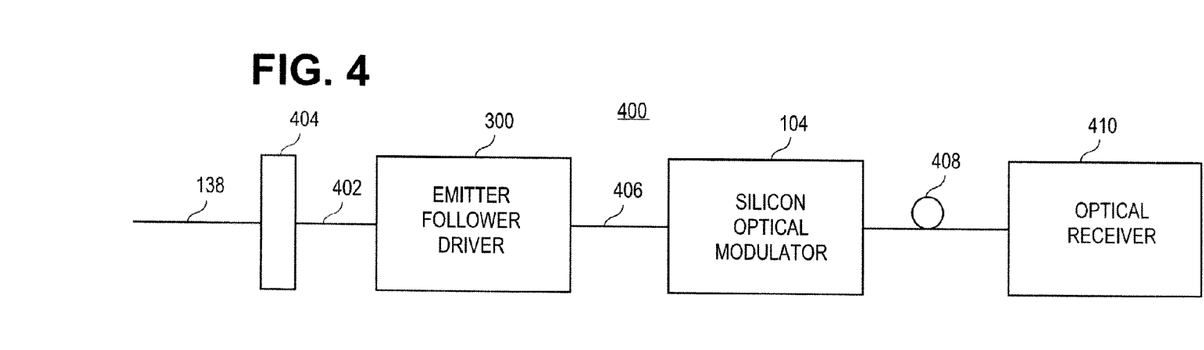
FIG. 4 is a high-level block diagram of a communication system according to an embodiment of the present invention.

FIG. 4 is a high-level block diagram of a communication system 400 according to an embodiment of the present invention. In the illustrated embodiment, the system 400 includes an electrical transmission line 402 coupled to the driver 300, which is coupled to the optical modulator 104. A connector 404 is coupled to the electrical transmission line 402. An optical waveguide 408, such as a planar waveguide or an optical fiber, for example, is coupled to the optical modulator 104 and to an optical receiver 410.

Figure 5:
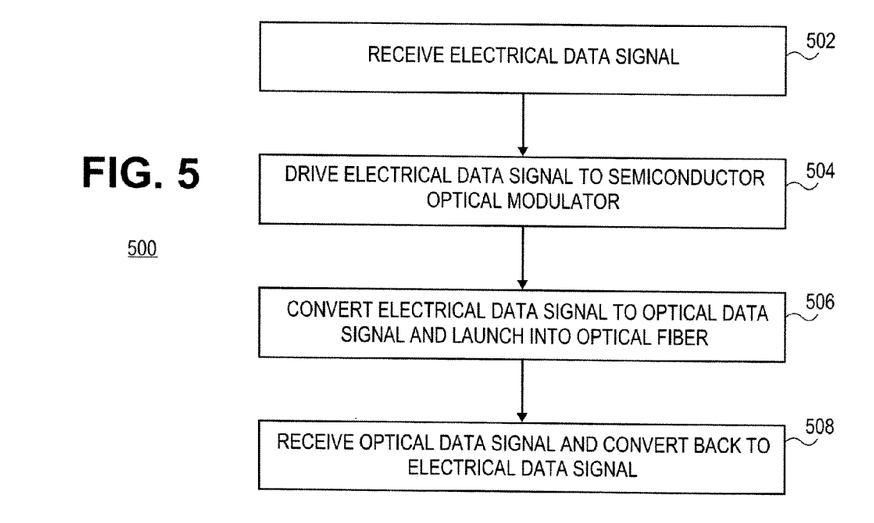
FIG. 5 is a flow chart illustrating an approach to operating the communication system depicted in FIG. 4 according to an embodiment of the present invention.

FIG. 5 is a flowchart illustrating a process 500 for operating the system 400 according to an embodiment of the present invention. The operations of the process 500 are described as multiple discrete blocks performed in turn in a manner that may be most helpful in understanding embodiments of the invention. However, the order in which they are described should not be construed to imply that these operations are necessarily order dependent or that the operations be performed in the order in which the blocks are presented.

In a block 502, the driver 300 may receive the electrical data signal 138. In one embodiment, the connector 404 may couple the electrical data signal 138 to the electrical transmission line 402. The connector 404 may be a 300-pin multi-source agreement (MSA) connector, an XFP connector, a XENPAK connector, a subminiature type A "SMA" connector, or other suitable connector.

Figure 6:
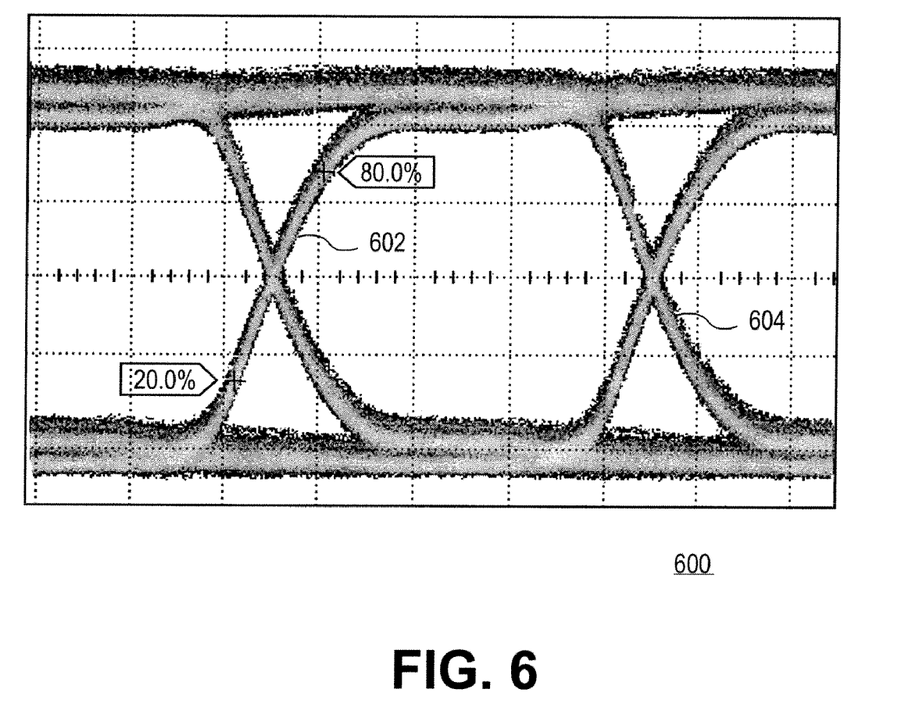
FIG. 6 is a graphical representation of an electrical signal having rising edge and a falling edge according to an embodiment of the present invention.

In a block 504, the driver 300 may drive the data signal 138 to the optical modulator 104. FIG. 6 is a graphical representation or eye pattern of an electrical signal 600 that may be measured at the point 406 in the system 400 according to an embodiment of the present invention. In the illustrated embodiment, the eye pattern 600 includes data bits acquired from the data signal 138 overlaid on top of each other. The example eye pattern 600 also includes a rising edge 602 and a falling edge 604.

The example eye pattern 600 illustrates that the rising edge 602 rate measured at twenty percent (20%) and eighty percent (80%) and the falling edge 604 rate, which may also be measured at twenty percent (20%) and eighty percent (80%), as well as the shape of the waveform in the eye pattern 600 are substantially symmetric. As a result of this symmetry, the current sourced from the positive output of a differential buffer in a driver implemented according to embodiments of the present invention may be substantially equal to the current drawn into the negative output of the same buffer.

Referring back to FIG. 5, in a block 506, the optical modulator 104 may convert the electrical data signal 138 to an optical data signal and launch the optical data signal into the optical waveguide 408.

In a block 508, the optical receiver 410 may receive the optical data signal, and convert it back to the electrical data signal 138. In one embodiment, the optical receiver 410 may be part of a microprocessor. In this embodiment, the optical receiver may process the data in the electrical data signal 138.

The process 500 is an example process and other processes may be used to implement embodiments of the present invention. A machine-accessible medium with machine-readable data thereon may be used to cause a machine, for example, a processor to perform the process 500.

In one embodiment, the transmission line 402 and the driver 300 may be formed in or on an integrated circuit or on-chip, and the optical modulator 104 may be off-chip. In this embodiment, the driver 300 may include multiple elements driven by the transmission line 402.

Figure 7:
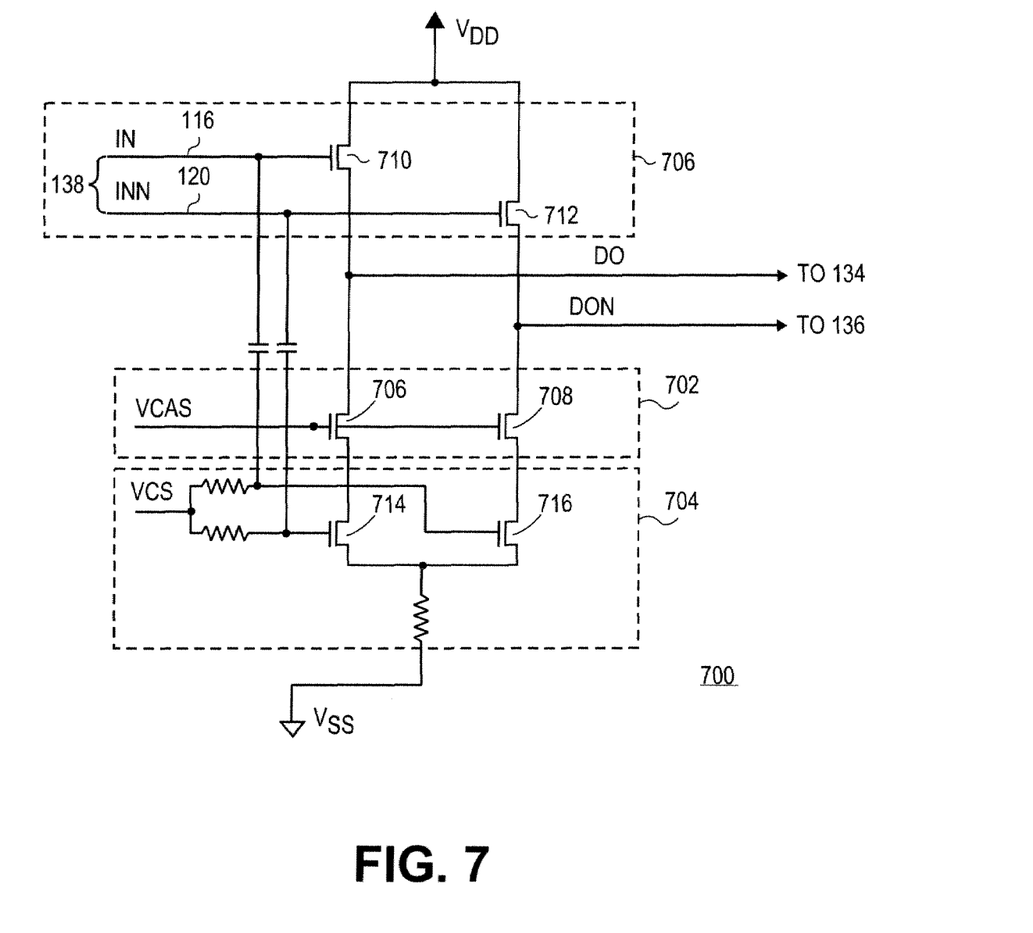
FIG. 7 is a schematic diagram of a driver according to an alternative embodiment of the present invention.

FIG. 7 is a schematic diagram of a driver 700 according to an alternative embodiment of the present invention in which the transistors are implemented using field effect transistors. In the illustrated embodiment, the driver 700 includes a source follower 706, a current source 704, and a cascode stage 702 coupled between the source follower 706 and the current source 704.

In the illustrated embodiment, the cascode stage 702 includes a first transistor 706 and a transistor 708, the current source 704 includes transistors 714 and 716, and the source follower 706 includes transistors 710 and 712. In embodiments of the present invention, the driver 700 operates similarly to the driver 300.

Embodiments of the present invention may be implemented using hardware, software, or a combination thereof. In implementations using software, the software may be stored on a machine-accessible medium.

A machine-accessible medium includes any mechanism that may be adapted to store and/or transmit information in a form accessible by a machine (e.g., a computer, network device, personal digital assistant, manufacturing tool, any device with a set of one or more processors, etc.). For example, a machine-accessible medium includes recordable and non-recordable media (e.g., read only memory (ROM), random access memory (RAM), magnetic disk storage media, optical storage media, flash memory devices, etc.), as recess as electrical, optical, acoustic, or other form of propagated signals (e.g., carrier waves, infrared signals, digital signals, etc.).

In the above description, numerous specific details, such as, for example, particular processes, materials, devices, and so forth, are presented to provide a thorough understanding of embodiments of the invention. One skilled in the relevant art will recognize, however, that the embodiments of the present invention may be practiced without one or more of the specific details, or with other methods, components, etc. In other instances, structures or operations are not shown or described in detail to avoid obscuring the understanding of this description.

Reference throughout this specification to "one embodiment" or "an embodiment" means that a particular feature, structure, process, block, or characteristic described in connection with an embodiment is included in at least one embodiment of the present invention. Thus, the appearance of the phrases "in one embodiment" or "in an embodiment" in various places throughout this specification does not necessarily mean that the phrases all refer to the same embodiment. The particular features, structures, or characteristics may be combined in any suitable manner in one or more embodiments. The terms used in the following claims should not be construed to limit embodiments of the invention to the specific embodiments disclosed in the specification and the claims. Rather, the scope of embodiments of the invention is to be determined entirely by the following claims, which are to be construed in accordance with established doctrines of claim interpretation.

What is claimed is:

1. An apparatus, comprising:
a silicon optical modulator; and
an integrated circuit coupled to the silicon optical modulator, the integrated circuit having:
a first emitter follower to drive a first data signal to the silicon optical modulator, the first data signal including a rising edge and a falling edge;
a second emitter follower to drive a second data signal to the silicon optical modulator, the second data signal including a rising edge and a falling edge;

a first current source coupled to the second emitter follower, the first content source having a first transistor coupled to a first capacitor, wherein the first capacitor is to differentiate the second data signal so that the first transistor turns on in response to the rising edge of the second data signal and turns off during the falling edge of the second data signal; and a second current source coupled to the first emitter follower, the second current source having a second transistor coupled to a second capacitor, wherein the second capacitor is to differentiate the first data signal so that the second transistor turns on in response to the rising edge of the first data signal and turns off during the falling edge of the first data signal.

2. The apparatus of claim 1, further comprising:

a buffer having a first output terminal and a second output terminal;

wherein the first emitter follower includes a third transistor having an emitter coupled to a first phase shifter in the silicon optical modulator, a base coupled to the first output terminal of the buffer, and a collector coupled to a collector voltage; and wherein the second emitter follower includes a fourth a transistor having an emitter coupled to a second phase shifter in the silicon optical modulator, a base coupled to the second output terminal of the buffer, and a collector coupled to the collector voltage.

3. The apparatus of claim 2, wherein:

the first current source includes further the first transistor having an emitter coupled to the emitter voltage, a base coupled to the base of the fourth transistor, to the second output terminal, and to a current source bias terminal, the first transistor further having a collector coupled to the emitter of the third transistor and to the first phase shifter; and the second current source includes further the second transistor having an emitter coupled to the emitter voltage, a base coupled to the base of the third transistor, to the first output terminal, and to the current source bias terminal, the second transistor further having a collector coupled to the emitter of the fourth transistor and the second phase shifter.

4. The apparatus of claim 3, further comprising:

a first resistor coupled between the current source bias terminal and the base of the first transistor; and a second resistor coupled between the current source bias terminal and the base of the second transistor.

5. The apparatus of claim 4, further comprising a resistor coupled between the emitters of the first and second transistors and the emitter voltage.

6. The apparatus of claim 2, wherein the fourth and the fourth transistors comprise silicon germanium heterojunction bipolar transistors.

7. An apparatus, comprising:

a silicon optical modulator; and an integrated circuit coupled to the silicon optical modulator, the integrated circuit having:

a first source follower to drive a first data signal to the silicon optical modulator, the first data signal including a rising edge and a falling edge;

a second source follower to drive a second data signal to the silicon optical modulator, the second data signal including a rising edge and a falling edge;

a first current source coupled to the second source follower, the first current source having a first transistor coupled to a first capacitor, wherein the first capacitor is to differentiate the second data signal so that the first transistor turns on in response to the rising edge of the second data signal and turns off during the falling edge of the second data signal; and a second current source coupled to the first source follower, the second current source having a second transistor coupled to a second capacitor, wherein the second capacitor is to differentiate the first data signal so that the second transistor turns on in response to the rising edge of the first data signal and turns off during the falling edge of the first data signal.

8. The apparatus of claim 7, further comprising:

a buffer having a first output terminal and a second output terminal;

wherein the first source follower includes a third transistor having an source coupled to a first phase shifter in the silicon optical modulator, a base coupled to the first output terminal of the buffer, and a collector coupled to a collector voltage; and wherein the second source follower includes a fourth a transistor having an source coupled to a second phase shifter in the silicon optical modulator, a base coupled to the second output terminal of the buffer, and a collector coupled to the collector voltage.

9. The apparatus of claim 8, further comprising:

the first current source includes further the first transistor having an source coupled to the source voltage, a gate coupled to the gate of the fourth transistor, to the second output terminal, and to a current source bias terminal, the first transistor further having a drain coupled to the source of the third transistor and to the first phase shifter; and the second current source includes further the second transistor having an source coupled to the source voltage, a gate coupled to the gate of the third transistor, to the first output terminal, and to the current source bias terminal, the second transistor further having a drain coupled to the source of the fourth transistor and the second phase shifter.

10. The apparatus of claim 8, wherein the third and the fourth transistors comprise field effect transistors.

11. A system, comprising:

a semiconductor optical modulator;

an integrated circuit coupled to the semiconductor optical modulator, the integrated circuit having:

a first emitter follower to drive a first data signal to the silicon optical modulator, the first data signal including a rising edge and a falling edge, a second emitter follower to drive a second data signal to the silicon optical modulator, the second data signal including a rising edge and a falling edge, a first current source coupled to the second emitter follower, the first current source having a first transistor coupled to a first capacitor, wherein the first capacitor is to differentiate the second data signal so that the first transistor turns on in response to the rising edge of the second data signal and turns off during the falling edge of the second data signal, and a second current source coupled to the first emitter follower, the second current source having a second transistor coupled to a second capacitor, wherein the second capacitor is to differentiate the first data signal so that the second transistor turns on in response to the rising edge of the first data signal and turns off during the falling edge of the first data signal; and a 300-pin multi-source agreement connector coupled to the integrated circuit to couple the data signal to the integrated circuit.

12. The system of claim 11, wherein the first data signal is one hundred eighty degrees out of phase with the second data signal.

13. The system of claim 11, wherein the first and second emitter followers comprise bipolar junction transistors.

14. A method, comprising:
   driving a first electrical data signal to a silicon optical modulator, the first electrical data signal including a rising edge and a falling edge;
   driving a second electrical data signal to the silicon optical modulator, the second electrical data signal including a rising edge and a falling edge;
   differentiating the first data signal so that a first current source turns on in response to the rising edge of the second electrical data signal and turns off during the falling edge of the second electrical data signal; and
   differentiating the second data signal so that a second current source in response to the rising edge of the first electrical data signal and turns off during the falling edge of the first electrical data signal.

15. The method of claim 14, further comprising converting the electrical data signal to an optical data signal.

16. The method of claim 15, further comprising launching the optical data signal into an optical fiber.

* * * * *